United States Patent
Wang et al.

(10) Patent No.: US 11,522,653 B2
(45) Date of Patent: Dec. 6, 2022

(54) METHOD, APPARATUS AND DEVICE FOR INDICATING POSITION OF RESOURCE SET AND PERFORMING RATE MATCHING

(71) Applicant: China Academy of Telecommunications Technology, Beijing (CN)

(72) Inventors: Lei Wang, Beijing (CN); Ekpenyong Tony, Beijing (CN); Deshan Miao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 182 days.

(21) Appl. No.: 16/960,873

(22) PCT Filed: Dec. 19, 2018

(86) PCT No.: PCT/CN2018/122160
§ 371 (c)(1),
(2) Date: Jul. 8, 2020

(87) PCT Pub. No.: WO2019/137175
PCT Pub. Date: Jul. 18, 2019

(65) Prior Publication Data
US 2021/0083817 A1    Mar. 18, 2021

(30) Foreign Application Priority Data
Jan. 12, 2018   (CN) .......................... 201810032157.0

(51) Int. Cl.
*H04L 5/00* (2006.01)
*H04W 72/04* (2009.01)

(52) U.S. Cl.
CPC .......... *H04L 5/0048* (2013.01); *H04L 5/0053* (2013.01); *H04W 72/0413* (2013.01)

(58) Field of Classification Search
CPC . H04L 5/0048; H04L 5/0053; H04W 72/0413
See application file for complete search history.

(56) References Cited

U.S. PATENT DOCUMENTS

| | | | |
|---|---|---|---|
| 2018/0091959 A1* | 3/2018 | Sun | H04L 27/3416 |
| 2019/0215217 A1* | 7/2019 | Kim | H04L 5/0048 |
| 2020/0235886 A1* | 7/2020 | Salim | H04L 27/2666 |

FOREIGN PATENT DOCUMENTS

| | | |
|---|---|---|
| CN | 107567085 A | 1/2018 |
| WO | 2017020837 A1 | 2/2017 |
| WO | 2017083137 A1 | 5/2017 |

OTHER PUBLICATIONS

Samsung, "On Rate Matching", 3GPP TSG RAN WG1 Meeting 90bis, Prague, CZ, Oct. 9-13, 2017, total 9 pages, R1-1717677.
(Continued)

*Primary Examiner* — Duc C Ho
(74) *Attorney, Agent, or Firm* — Kilpatrick Townsend & Stockton, LLP

(57) ABSTRACT

Disclosed are a method, an apparatus and a device for indicating a position of a resource set and performing rate matching, the method including: a base station indicating a position of at least one resource set to a terminal via explicit signaling, and the position of the at least one resource set is a position where rate matching is required when the terminal transmits data on an uplink channel; and the terminal receiving the position of the at least one resource set indicated by the base station to the terminal via the explicit signaling, and performing rate matching of uplink data according to the position in the indication.

20 Claims, 3 Drawing Sheets

(56) References Cited

OTHER PUBLICATIONS

Ericsson, "On rate matching", 3GPP TSG-RAN WG1 NR Ad Hoc #3, Nagoya, Japan, Sep. 18-21, 2017, total 4 pages, R1-1716346.
CATT, "Details of rate matching for POSCH and PUSCH", 3GPP TSG RAN WG1 Meeting 90bis, Prague, CZ, Oct. 9-13, 2017, total 6 pages, R1-1717841.
LG Electronics, "Discussion on rate matching for PDSC/PUSCH", 3GPP TSG RAN WG1 Meeting 90bls, Prague, CZ, Oct. 9-13, 2017, total 11 pages, R1-1717974.
Samsung, "On PDSCH/PUSCH Rate Matching for NR", 3GPP TSG RAN WG1 Meeting NR#3, Nagoya, Japan, Sep. 18-21, 2017, total 3 pages, R1-1715932.
LG Electronics, "Remaining issues on rate matching resources", 3GPP TSG RAN WG1 Meeting 91, Reno, USA, Nov. 27-Dec. 1, 2017, total 11 pages, R1-1719937.
Samsung, "On Rate Matching", 3GPP TSG RAN WG1 Meeting 91, Reno, USA, Nov. 27-Dec. 1, 2017, total 8 pages, R1-1720351.
Ericsson, "On RS related rate matching for DL and UL", 3GPP TSG-RAN WG1 #91 Reno, USA, Nov. 27-Dec. 1, 2017, total 2 pages, R1-1720983.

\* cited by examiner

METHOD, APPARATUS AND DEVICE FOR INDICATING POSITION OF RESOURCE SET AND PERFORMING RATE MATCHING

The present application is a US National Stage of International Application No. PCT/CN2018/122160, filed on Dec. 19, 2018, which claims priority to the Chinese Patent Application No. 201810032157.0, filed to the Patent Office of the People's Republic of China on Jan. 12, 2018 and entitled "Method, Apparatus and Device for Indicating Position of Resource Set and Performing Rate Matching", the entire contents of which are incorporated herein by reference.

FIELD

The present application relates to the field of wireless communication and in particular to a method, an apparatus and a device for indicating a position of a resource set and performing rate matching.

BACKGROUND

The mobile internet is overturning the traditional mobile communication service mode, providing unprecedented usage experience for users and deeply affecting the work and life of people in all aspects. The mobile internet will promote the further upgrade of an information interaction form of the human society, and provide more abundant service experience such as augmented reality, virtual reality, an ultrahigh-definition (3D) video and mobile cloud for the users. The further development of the mobile internet will make the mobile traffic increased by over 1000 times in the future and promote a new round of change of a mobile communication technology and industry. The internet of things expands the service range of mobile communication and extends from human-to-human communication to intelligent human-to-things and things-to-things interconnection, so that the mobile communication technology penetrates into broader industry and fields. In the future, mobile healthcare, internet of vehicles, intelligent home, industrial control, environment monitoring and the like will promote the explosive increment of internet of things applications, hundreds of billions of equipment will be accessed to the network to realize real "interconnection of everything". Meanwhile, massive equipment connection and diversified internet of things services will also bring new technical challenges for mobile communication.

With the continuous emergence and enrichment of new service requirements, higher performance requirements for a future mobile communication system will be proposed, such as higher peak rate, higher user experience rate, shorter delay, higher reliability, higher spectrum efficiency and higher energy consumption efficiency, and it is required that more user access is supported and various service types are used. In order to support a huge number of various terminal connections and different service types, the flexible configuration of uplink and downlink resources has become a major trend of technical development. A future system resource may be divided into different sub-bands according to different services, and Transmission Time Intervals (TTIs) with different lengths are divided on the sub-bands, so that various service requirements are met.

When being configured in an existing Long Term Evolution (LTE) system, a Sounding Reference signals (SRS) may be only transmitted on the last Orthogonal Frequency Division Multiplex (OFDM) symbol of a subframe. The resource configuration of the SRS is realized by means of cell-specific wireless resource control Radio Resource Control (RRC) signaling and UE-specific RRC signaling. A SRS resource configured by means of the UE-specific RRC signaling is a subset of the SRS resource configured by means of the cell-specific RRC signaling. A terminal performs rate matching on uplink data according to cell-specific SRS configuration.

In the existing LTE system, the SRS may only be transmitted on the last OFDM symbol of the subframe, the overhead is 1/14 when the overhead is the maximum. However, in a new radio access technology (NR) system, the SRS of different user equipment (UE) may not be configured on any one or several symbols in the last six symbols of one slot. The overhead is 6/14 when the overhead is the maximum, which may greatly affect uplink transmission. For a Physical Uplink Control Channel (PUCCH) resource and a Physical Uplink Shared Channel (PUSCH) which are semi-statically configured, avoiding the SRS by flexible resource configuration may not be realized, and therefore, it is unavoidable to result in resource conflict.

SUMMARY

The present application provides a method, an apparatus and a device for indicating a position of a resource set and performing rate matching to solve the problems of resource conflict and overlarge overhead brought by more flexible SRS configuration.

An embodiment of the present application provides a method for indicating a position of a resource set, including:
determining, by a base station, the position of at least one resource set, where the position of the at least one resource set is a position where rate matching is required when a terminal transmits data on an uplink channel; and
indicating, by the base station, the position of the at least one resource set to the terminal via explicit signaling.

In the embodiment, when the base station indicates the position of the at least one resource set to the terminal via explicit signaling, the base station indicates the position to the terminal via high-layer signaling, and
the number of the at least one resource set is N, and a period that each resource set occurs is independently configured, and N is a positive integer greater than or equal to 1; and
a resource set is composed of T OFDM symbols on a time domain and F RBs on a frequency domain, where T is an integer greater than or equal to 0, and F is an integer greater than or equal to 0.

In the embodiment, the period is configured by the high-layer signaling by taking slot as a device, and a minimum period is 1 slot.

In the embodiment, for any one of the at least one resource set, when T or F is zero, the any one resource set for which the rate matching is required does not exist.

In the embodiment, T OFDM symbols are continuous resources or non-continuous resources, and F RBs are continuous resources or non-continuous resources.

In the embodiment, said indicating, by the base station, the position of the at least one resource set to the terminal via the explicit signaling includes:
configuring, by the base station via the high-layer signaling, N resource sets for which the rate matching is required when the terminal transmits the data on the uplink channel; and indicating, by the base station via Layer-1 (L1) signaling, serial numbers of the resource sets for which the rate matching is required when the terminal transmits the data on the uplink channel.

In the embodiment, the serial numbers of the resource sets are indicated to the terminal via M-bit L1 signaling when the number of the resource sets is N, and M=ceil($\log_2$(N)), ceil is a function name, and the ceil function is used for returning the minimum integer greater than or equal to a specified expression.

In the embodiment, when the base station indicates the position of the at least one resource set to the terminal via the explicit signaling, the base station indicates the position to the terminal via the L1 signaling.

In the embodiment, the base station indicates the number of the OFDM symbols and the position of the OFDM symbols to the terminal via the L1 signaling with a corresponding quantity of bits.

In the embodiment, the at least one resource set is overlapped with a demodulation reference signal (DMRS) on resources.

An embodiment of the present application provides a method for performing rate matching, including:

receiving a position of at least one resource set, indicated to a terminal by a base station via explicit signaling, and the position is a position where the rate matching is required when the terminal transmits data on an uplink channel; and performing the rate matching on uplink data according to the indicated position of the at least one resource set.

In the embodiment, when the base station indicates the position of the at least one resource set to the terminal via explicit signaling, the base station indicates the position to the terminal via high-layer signaling, and the number of the at least one resource set is N, and a period that each resource set occurs is independently configured, and N is a positive integer greater than or equal to 1; and a resource set is composed of T OFDM symbols on a time domain and F RBs on a frequency domain, where T is an integer greater than or equal to 0, and F is an integer greater than or equal to 0.

In the embodiment, the period is configured by the high-layer signaling by taking slot as a device, and a minimum period is 1 slot.

In the embodiment, for any one of the at least one resource set, when T or F is zero, the any one resource set for which the rate matching is required does not exist.

In the embodiment, T OFDM symbols are continuous resources or non-continuous resources, and F RBs are continuous resources or non-continuous resources.

In the embodiment, when the base station indicates the position of the at least one resource set to the terminal via the explicit signaling, the method includes:

configuring, by the base station via the high-layer signaling, N resource sets for which the rate matching is required when the terminal transmits the data on the uplink channel, where N is a positive integer greater than or equal to 1; and indicating, by the base station via Layer-1 signaling, serial numbers of the resource sets for which the rate matching is required when the terminal transmits the data on the uplink channel.

In the embodiment, the serial numbers of the resource sets are indicated to the terminal via M-bit L1 signaling when the number of the resource sets is N, where M=ceil($\log_2$(N)), ceil is a function name, and the ceil function is used for returning the minimum integer greater than or equal to a specified expression.

In the embodiment, when the base station indicates the position of the at least one resource set to the terminal via the explicit signaling, the base station indicates the position to the terminal via the L1 signaling.

In the embodiment, the base station indicates the number of the OFDM symbols and the position of the OFDM symbols to the terminal via the L1 signaling with a corresponding quantity of bits.

In the embodiment, the method further includes:

not performing the rate matching on a DMRS when the position of the at least one resource set is overlapped with the DMRS.

An embodiment of the present application provides a base station, including:

a processor, configured to read a program in a memory and execute the following process:

determining a position of at least one resource set, where the position of the at least one resource set is a position where the rate matching is required when a terminal transmits data on an uplink channel; and a transceiver, configured to receive and transmit data under a control of the processor and execute the following process:

indicating the position of the at least one resource set to the terminal via explicit signaling.

In the embodiment, when the base station indicates the position of the at least one resource set to the terminal via explicit signaling, the base station indicates the position to the terminal via high-layer signaling, and the number of the at least one resource set is N, and a period that each resource set occurs is independently configured, and N is a positive integer greater than or equal to 1; and a resource set is composed of T OFDM symbols on a time domain and F RBs on a frequency domain, where T is an integer greater than or equal to 0, and F is an integer greater than or equal to 0.

In the embodiment, the period is configured by the high-layer signaling by taking slot as a device, and a minimum period is 1 slot.

In the embodiment, for any one of the at least one resource set, when T or F is zero, the any one resource set for which the rate matching is required does not exist.

In the embodiment, T OFDM symbols are continuous resources or non-continuous resources, and F RBs are continuous resources or non-continuous resources.

In the embodiment, said indicating, by the base station, the position of the at least one resource set to the terminal via the explicit signaling includes:

configuring, by the base station via the high-layer signaling, N resource sets for which the rate matching is required when the terminal transmits the data on the uplink channel, and N is a positive integer greater than or equal to 1; and indicating, by the base station via L1 signaling, serial numbers of the resource sets for which the rate matching is required when the terminal transmits the data on the uplink channel.

In the embodiment, the serial numbers of the resource sets are indicated to the terminal via M-bit L1 signaling when the number of the resource sets is N, and M=ceil($\log_2$(N)), ceil is a function name, and the ceil function is used for returning the minimum integer greater than or equal to a specified expression.

In the embodiment, when the base station indicates the position of the at least one resource set to the terminal via the explicit signaling, the base station indicates the position to the terminal via the L1 signaling.

In the embodiment, the base station indicates the number of the OFDM symbols and the position of the OFDM symbols to the terminal via the L1 signaling with a corresponding quantity of bits.

In the embodiment, the at least one resource set is overlapped with a DMRS on resources.

An embodiment of the present application provides a user terminal, including:

a transceiver, configured to receive and transmit data under a control of a processor and execute the following process:

receiving a position of at least one resource set, indicated to a terminal by a base station via explicit signaling, where the position is a position where the rate matching is required when the terminal transmits data on an uplink channel; and the processor, configured to read a program in a memory and execute the following process:

performing the rate matching on uplink data according to the indicated position of the at least one resource set.

In the embodiment, when the base station indicates the position of the at least one resource set to the terminal via explicit signaling, the base station indicates the position to the terminal via high-layer signaling, and the number of the at least one resource set is N, and a period that each resource set occurs is independently configured, where N is a positive integer greater than or equal to 1; and a resource set is composed of T OFDM symbols on a time domain and F RBs on a frequency domain, where T is an integer greater than or equal to 0, and F is an integer greater than or equal to 0.

In the embodiment, the period is configured by the high-layer signaling by taking slot as a device, and a minimum period is 1 slot.

In the embodiment, for any one of the at least one resource set, when T or F is zero, the any one resource set for which the rate matching is required does not exist.

In the embodiment, T OFDM symbols are continuous resources or non-continuous resources, and F RBs are continuous resources or non-continuous resources.

In the embodiment, when the base station indicates the position of the at least one resource set to the terminal via the explicit signaling, the method includes:

configuring, by the base station via the high-layer signaling, N resource sets for which the rate matching is required when the terminal transmits the data on the uplink channel, where N is a positive integer greater than or equal to 1; and indicating, by the base station via Layer-1 (L1) signaling, serial numbers of the resource sets for which the rate matching is required when the terminal transmits the data on the uplink channel.

In the embodiment, the serial numbers of the resource sets are indicated to the terminal via M-bit L1 signaling when the number of the resource sets is N, where $M=\text{ceil}(\log_2(N))$, ceil is a function name, and the ceil function is used for returning the minimum integer greater than or equal to a specified expression.

In the embodiment, when the base station indicates the position of the at least one resource set to the terminal via the explicit signaling, the base station indicates the position to the terminal via the L1 signaling.

In the embodiment, the base station indicates the number of the OFDM symbols and the position of the OFDM symbols to the terminal via the L1 signaling with a corresponding quantity of bits.

In the embodiment, the method further includes:

not performing the rate matching on a DMRS when the position of the at least one resource set is overlapped with the DMRS.

An embodiment of the present application provides a device for indicating a position of a resource set, including:

a determining device, configured to determine, by a base station, the position of at least one resource set, and the position of the at least one resource set is a position where rate matching is required when a terminal transmits data on an uplink channel; and an indication device, configured to indicate, by the base station, the position of the at least one resource set to the terminal via explicit signaling.

An embodiment of the present application provides a device for performing rate matching, including:

a receiving device, configured to receive a position of at least one resource set, indicated to a terminal by a base station via explicit signaling, and the position is a position where the rate matching is required when the terminal transmits data on an uplink channel; and a matching device, configured to perform the rate matching on uplink data according to the indicated position of the at least one resource set.

The embodiments of the present application, the base station informs rate matching information when the terminal transmits the uplink channel, and the terminal performs rate matching on the resource sets configured by the base station when transmitting the uplink channel according to the rate matching information informed by the base station. In the solutions, the rate matching of the uplink data is informed by the base station, in this way, the restriction that the data may only be transmitted according to the maximum SRS resource configuration due to the SRS configuration is avoided, and rate matching may be performed around the determined resource location when the terminal transmits the uplink channel, so that restrictions generated when the uplink channel is transmitted are reduced.

BRIEF DESCRIPTION OF THE DRAWINGS

The accompanying drawings described herein are provided for further understanding of the present application, and constitute one part of the present application. The schematic embodiments and descriptions thereof in the present application serve to explain the present application, rather than to inappropriately limit the present application. In the accompanying drawings.

DETAILED DESCRIPTION OF THE EMBODIMENTS

In a future mobile communication system, SRS resources are all semi-statically configured by means of UE-specific RRC signaling, SRS may be transmitted on one, two or four OFDM symbols and may also be transmitted on any 1/2/4 symbols in the last six OFDM symbols in one slot, and therefore, the configuration is more flexible and the overhead is larger. PUCCH resources are configured semi-statically. The SRS has the characteristic of periodicity, and the PUCCH resources semi-statically configured may also be superposed with the SRS resources, so that there is no clear solution for solving the conflicts there between currently. Based on this, embodiments of the present application provides a method for indicating a position of a resource set and a method for performing rate matching, and the specific implementation ways of the present application will be described below in combination with the accompanying drawings.

During description, implementations at a UE side and a base station side will be respectively described, and then, examples in which the UE side and the base station side are cooperatively implemented will be given, so that implementations of solutions given in the embodiments of the present application are better understood. Such a description way does not mean that the UE side and the base station side have to be cooperatively implemented or have to be implemented alone, in fact, problems of the UE side and the base station side may also be respectively solved when the UE side and the base station side are separately implemented, but a better technical effect may be obtained when the UE side and the base station side are jointly implemented.

Figure 1:
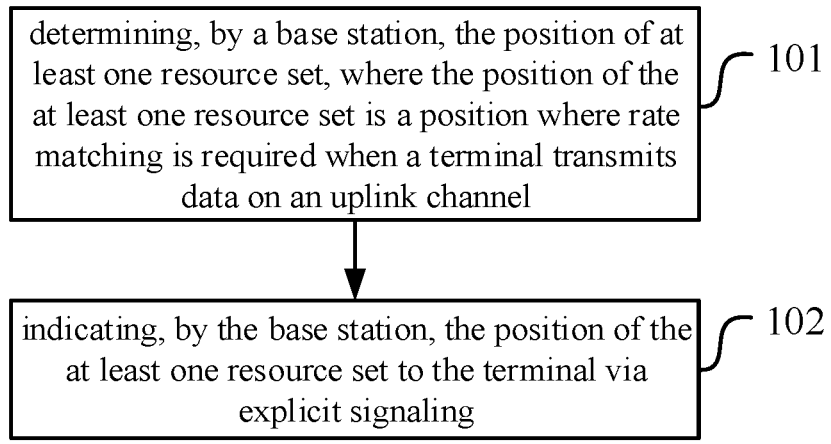
FIG. 1 illustrates a schematic diagram of an implementation process of a method for indicating a position of a resource set at a base station side in an embodiment of the present application.

FIG. 1 illustrates a schematic diagram of an implementation process of a method for indicating a position of a resource set at a base station side, as shown in FIG. 1, and including:

step 101, determining, by a base station, the position of at least one resource set, where the position of the at least one resource set is a position where rate matching is required when a terminal transmits data on an uplink channel; and step 102, indicating, by the base station, the position of the at least one resource set to the terminal via explicit signaling.

Specifically, that is, the base station indicates the position of the at least one resource set where rate matching is required when the terminal transmits the data on the uplink channel via explicit signaling.

When the resource set is configured, configuration ways may include:

1. the resource set is configured by adopting high-layer signaling;
2. the resource set is configured by adopting high-layer signaling, and the high-layer signaling of the terminal is informed to configure the resource set for which rate matching is required via L1 signaling; and
3. the L1 signaling is adopted, namely the resource set is not configured via the high-layer signaling, but OFDM symbols for which rate matching is required are indicated by only adopting the L1 signaling.

Specific indication ways are respectively described below.

1. When the base station indicates the position of at least one the resource set to the terminal via the explicit signaling, the base station indicates the position to the terminal via high-layer signaling, where the number of the at least one resource set is N, and a period that each resource set occurs is independently configured, where N is a positive integer greater than or equal to 1; and a resource set is composed of T OFDM symbols on a time domain and F RBs on a frequency domain, where T is an integer greater than or equal to 0, and F is an integer greater than or equal to 0.

In the embodiment, the period is configured by the high-layer signaling by taking slot as a device, and a minimum period is 1 slot.

In the embodiment, for any one of the at least one resource set, when T or F is zero, it means that the any one resource set for which the rate matching is required does not exist.

In the embodiment, T OFDM symbols are continuous resources or non-continuous resources, and F RBs are continuous resources or non-continuous resources.

Specifically, when the base station configures the positions of the resource sets where rate matching is required when the terminal transmits the data on the uplink channel via the high-layer signaling, the number of the resource sets is N, and a period that each resource set occurs is independently configured, where N is a positive integer greater than or equal to 1. The period is configured by taking slot as a device, the minimum period is 1 slot, and the period is configured by the high-layer signaling.

Particularly, when only one resource set is required to be configures by the base station, the resource set is effective in every slot.

Specifically, a resource set may be composed of T OFDM symbols on a time domain and F RBs on a frequency domain, where T is an integer greater than or equal to 0, and F is an integer greater than or equal to 0.

For any one of the at least one resource set, when T or F is zero, it means that the any one resource set for which the rate matching is required does not exist; and T OFDM symbols may be continuous resources or non-continuous resources, and F RBs may be continuous resources or non-continuous resources.

2. said indicating, by the base station, the position of the at least one resource set to the terminal via the explicit signaling includes:

configuring, by the base station via the high-layer signaling, N resource sets for which the rate matching is required when the terminal transmits the data on the uplink channel; and indicating, by the base station via L1 signaling, serial numbers of the resource sets for which the rate matching is required when the terminal transmits the data on the uplink channel.

In the embodiment, the serial numbers of the resource sets are indicated to the terminal via M-bit L1 signaling when the number of the resource sets is N, and $M=\text{ceil}(\log_2(N))$, ceil is a function name, and the ceil function is used for returning the minimum integer greater than or equal to a specified expression.

Specifically, the base station, via the high-layer, configures the N resource sets for which the rate matching is required when the terminal transmits the data on the uplink channel signaling and indicates, via M-bit L1 signaling, the serial numbers of the resource sets for which the rate matching is required when the terminal transmits the data on the uplink channel.

Specifically, $M=\text{ceil}(\log_2(N))$, the configuration way of the N resource sets may be described as above, the descriptions thereof are omitted herein.

3. When the base station indicates the position of the at least one resource set to the terminal via the explicit signaling, the base station indicates the position to the terminal via the L1 signaling.

In the embodiment, the base station indicates the number of the OFDM symbols and the position of the OFDM symbols to the terminal via the L1 signaling with a corresponding quantity of bits.

Specifically, when the base station indicates the position of the resource set for which rate matching is required when the terminal transmits the data on the uplink channel via the L1 signaling, the quantity of bits required to be used may be determined according to information quantity required by the number of the OFDM symbols and the position required to be indicated, and then, indication is realized via the L1 signaling with the corresponding quantity of bits. For example, if the resource set occupy 0 symbol or 2 continuous symbols or 4 continuous symbols or 6 continuous symbols, the position of the time domain for rate matching is indicated by 2 bit; or the position of the time domain for rate matching is indicated by 3 bit, for example, the resource set are indicated to occupy 0 continuous symbol, 1 continuous symbol, 2 continuous symbols, 3 continuous symbols, 4 continuous symbols, 5 continuous symbols or 6 continuous symbols.

In the embodiment, the resource set is overlapped with a DMRS on resources.

Specifically, in the above-mentioned process, if an informed resource region is overlapped with the DMRS, the terminal does not perform rate matching on the DMRS; namely the DMRS is still transmitted on the resource.

An embodiment of the present application further provides an implementation solution at a corresponding terminal side, which is described below.

Figure 2:
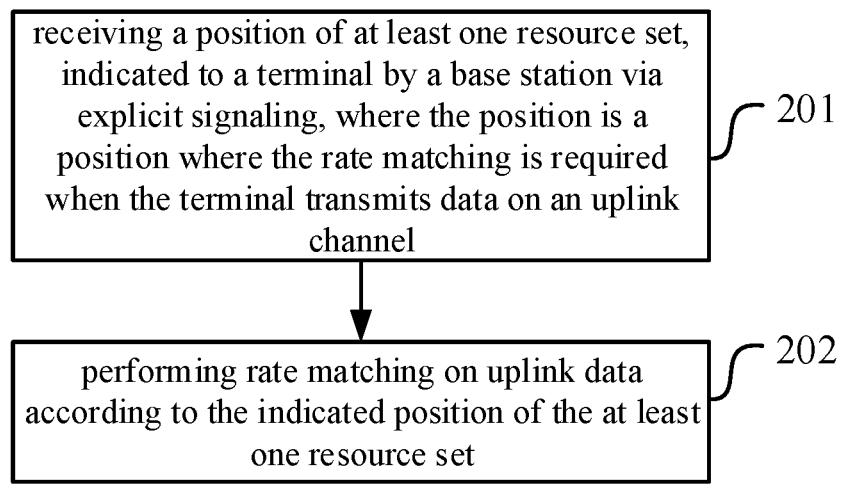
FIG. 2 illustrates a schematic diagram of an implementation process of a method for performing rate matching at a terminal side in an embodiment of the present application.

FIG. 2 illustrates a schematic diagram of an implementation process of a method for performing rate matching at a terminal side, as shown in FIG. 2, and including:

step 201, receiving a position of at least one resource set, indicated to a terminal by a base station via explicit signaling, where the position is a position where the rate matching is required when the terminal transmits data on an uplink channel; and step 202, performing rate matching on uplink data according to the indicated position of the at least one resource set.

It is easy to understand that the implementations of the resource sets are identical during implementation to refer to the implementation at the base station side, the descriptions thereof are omitted herein.

The terminal side may perform the corresponding processing according to the indication ways of the base station side as follows:

1. if the terminal receives the configuration of resource sets of rate matching from the base station via the high-layer signaling, the terminal performs rate matching according to the resource sets, when transmitting the uplink data on the uplink channel according to the resource resets and the periods configured according to the high-layer; or 2. the terminal determines a region where rate matching is required when transmitting the uplink data on the uplink channel according to the resource sets of rate matching configured by the high-layer signaling and the serial numbers of the resource sets carried in downlink control information (DCI); or 3. the terminal determines positions of time domain resources for rate matching when transmitting the uplink data on the uplink channel according to 2 bit or 3 bit indication information of rate matching carried in the DCI.

The terminal performs rate matching according to the positions of the time domain resources indicated by the DCI when transmitting the uplink channel, namely the time domain resources indicated by the DCI are incapable of transmitting the uplink channel.

The followings are described in combination with examples.

Embodiment 1

Figure 3:
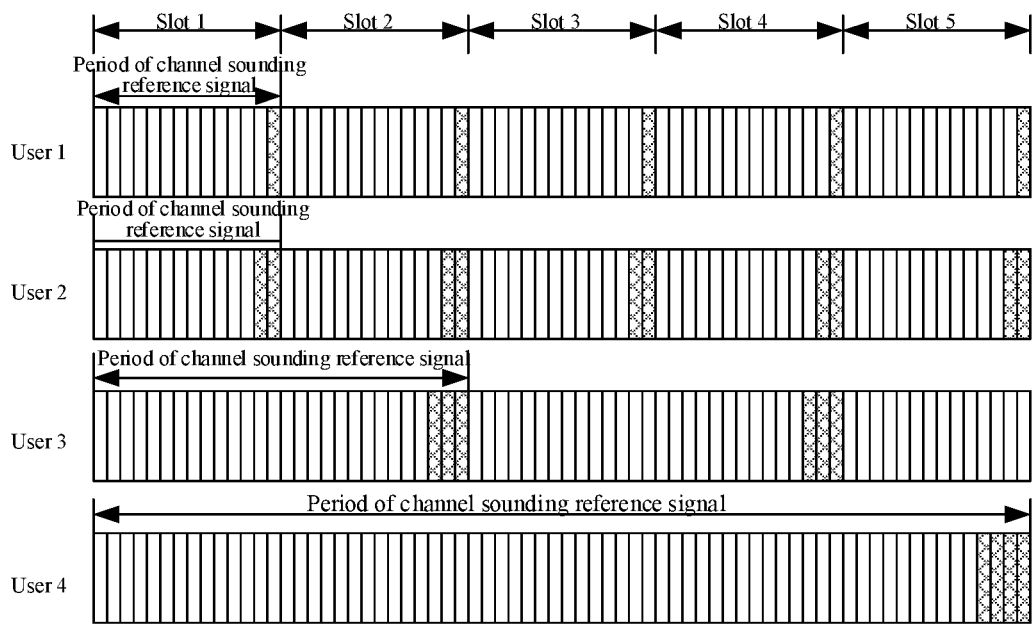
FIG. 3 illustrates a schematic diagram of SRS configuration in embodiment 1 in the embodiment of the present application.

FIG. 3 illustrates a schematic diagram of SRS configuration in embodiment 1, it is assumed that there are four UEs in a system and the four UEs is provided with different SRS configurations, and the SRS configurations of the four UEs are shown as FIG. 3.

It is assumed that UE1 has the SRS period being 1 slot, the duration time being 1 OFDM symbol and the bandwidth being B1, UE2 has the SRS period being 1 slot, the duration time being 2 OFDM symbols and the bandwidth being B2, UE3 has the SRS period being 2 slots, the duration time being 3 OFDM symbols and the bandwidth being B3, and UE4 has the SRS period being 5 slots, the duration time being 4 OFDM symbols and the bandwidth being B4.

A base station side configures one super-set for a terminal, and the terminal performs rate matching according to the super-set when transmitting a PUCCH. The super-set is taken as the maximum range on time domains and frequency domains of all the SRS configurations.

In the embodiment, SRS resources at most occupy 4 OFDM symbols on the time domains, and it is assumed that B1>B2>B3>B4 on the frequency domains, the super-set occupies 4 OFDM symbols on the time domains and Bset Physical Resource Blocks (PRBs) on the frequency domains, where Bset is a union set of B1, B2, B3 and B4 on the frequency domains. When Bset is greater than a BandWidth Part (BWP) where the data transmitted by the terminal is located, it means that data on other channels may not be transmitted on time domain resources occupied by the super-set within the BWP.

Of course, the base station may also configure a relatively small super-set according to the SRS configurations of all the terminals in the system.

Embodiment 2

Figure 4:
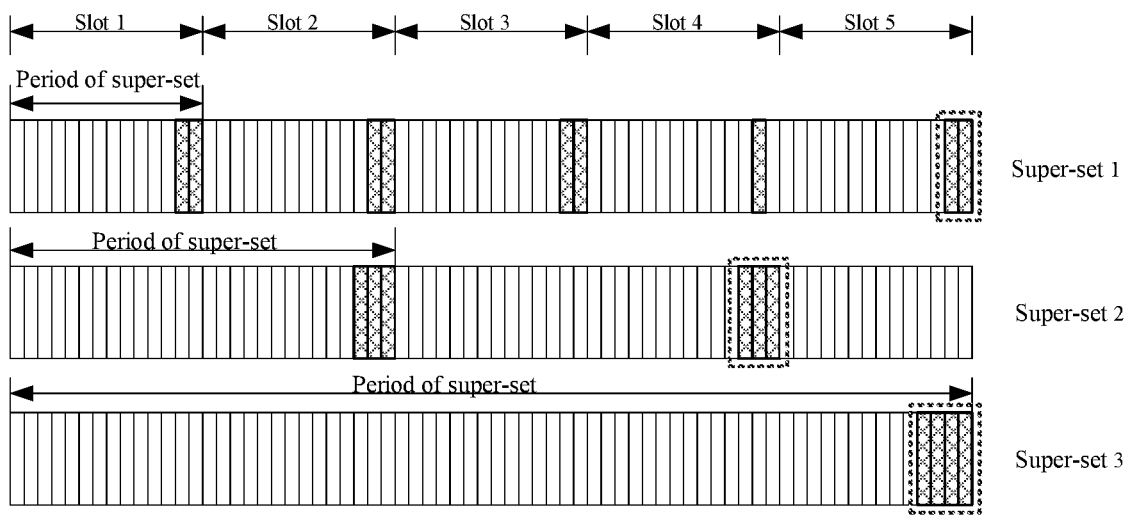
FIG. 4 illustrates a schematic diagram of SRS configuration in embodiment 2 in the embodiment of the present application.

FIG. 4 illustrates a schematic diagram of SRS configuration in embodiment 2, it is assumed that there are four UEs in a system and the four UEs is provided with different SRS configurations, and the SRS configurations of the 4 UE are shown as FIG. 4.

It is assumed that UE1 has the SRS period being 1 slot, the duration time being 1 OFDM symbol and the bandwidth being B1, UE2 has the SRS period being 1 slot, the duration time being 2 OFDM symbols and the bandwidth being B2, UE3 has the SRS period being 2 slots, the duration time being 3 OFDM symbols and the bandwidth being B3, and UE4 has the SRS period being 5 slots, the duration time being 4 OFDM symbols and the bandwidth being B4.

A base station side configures N super-sets for a terminal via high-layer signaling, and the different super-sets have different periods.

In the present embodiment, N=3. With the schematic diagram in embodiment 1 as an example, the positions of the time domain resources of the three super-sets are shown as schematic parts of a bold box in FIG. 4.

It is assumed that B1>B2>B3>B4 on the frequency domains, the bandwidth occupied on the frequency domains by super-set' is Bset, the bandwidth occupied on the frequency domains by super-set2 is Bset, and the bandwidth occupied on the frequency domains by super-set3 is Bset. When Bset is greater than a BWP where the data transmitted by the terminal is located, it means that data on other channels may not be transmitted on time domain resources occupied by the super-set within the BWP.

The terminal performs rate matching according to the super-set configured by the base station when transmitting a PUCCH carrying Acknowledgement/Negative Acknowledgement (ACK/NACK).

Embodiment 3

It is assumed that there are four UEs in a system and the four UEs is provided with different SRS configurations, and the SRS configurations of the four UEs are shown as FIG. 3 in embodiment 1.

It is assumed that UE1 has the SRS period being 1 slot, the duration time being 1 OFDM symbol and the bandwidth being B1, UE2 has the SRS period being 1 slot, the duration time being 2 OFDM symbols and the bandwidth being B2, UE3 has the SRS period being 2 slots, the duration time being 3 OFDM symbols and the bandwidth being B3, and UE4 has the SRS period being 5 slots, the duration time being 4 OFDM symbols and the bandwidth being B4.

A base station configures several resource sets for uplink rate matching via high-layer signaling, for example, four sets of SRS resources are configured according to the configuration condition of the SRS resources in the system:

Set1 occupies the last OFDM symbol in the slot and B1 RBs on the frequency domains, set2 occupies the last two continuous OFDM symbols in the slot and B2 RBs on the frequency domains, set3 occupies the last three continuous OFDM symbols in the slot and B3 RBs on the frequency domains, and set4 occupies the last three continuous OFDM symbols in the slot and B4 RBs on the frequency domains.

When the base station schedules downlink data, a distribution condition of the resource sets of rate matching within the slot when the ACK/NACK is transmitted is indicated by using a 2 bit indication domain. A corresponding relationship between 2 bit indication information and a set is shown as the following table 1:

TABLE 1

Corresponding Relationship Table Between 2 bit Indication Information and Set

| Indication bits | Resource set index |
| --- | --- |
| 00 | Set1 |
| 01 | Set2 |
| 10 | Set3 |
| 11 | Set4 |

A terminal determines positions of resources occupied by SRS within the slot when a PUCCH is transmitted according to the indication information in the DCI and the terminal performs rate matching.

Of course, when the base station configures the resource sets via the high-layer signaling, the sizes of the frequency domain resources are not limited to numerical values in the present embodiment and may be determined according to the configuration condition of the SRS resources in the system. In addition, it is also possible to configure only the time domain resources, rather than to configure the sizes of frequency domain resources, namely it is regarded that all the frequency domain resources on one symbol serve as constituent parts of the resource sets.

Embodiment 4

In the present embodiment, a base station only indicates rate matching information generated when an uplink channel is transmitted via indication information carried in DCI. For example, via 3 bit indication information carried in the DCI, the base station indicates a terminal of positions of time domains where SRS transmission is located within the slot when a terminal transmits a PUCCH carrying ACK/NACK, and the specific information is shown as the following table 2:

TABLE 2

Corresponding Relationship Table Between Indication Information and Positions of Time Domains Where SRS Transmission is Located

| Indication bits | SRS position |
| --- | --- |
| 000 | No SRS transmission |
| 001 | The last OFDM symbol within the Slot |
| 010 | The last two OFDM symbols within the Slot |
| 011 | The last three OFDM symbols within the Slot |
| 100 | The last four OFDM symbols within the Slot |
| 101 | The last five OFDM symbols within the Slot |
| 110 | The last six OFDM symbols within the Slot |
| 111 | Reserved |

The terminal performs rate matching according to the indication information in table 2 when transmitting the PUCCH within the corresponding slot.

Further, in order to reduce the overhead of the DCI, the base station may indicate parts of combinations in all time domain combinations of SRS via 2 bit indication information carried in the DCI, for example, positions of time domain resources of SRS within the slot are indicated as 0 OFDM symbol, the last two OFDM symbols, the last four OFDM symbols and the last six OFDM symbols.

In addition, in the embodiment, configuration ways of resource sets and a way that the terminal performs rate matching when transmitting an uplink channel are the same as those in embodiments 1-4 when an uplink transmission channel is a PUSCH, the descriptions thereof are omitted herein.

Based on the same inventive concept, an embodiment of the present application further provides a base station, a user terminal, a device for indicating a position of a resource set and a device for performing rate matching, the principles of solving the problem for these equipment are similar to those of the method for indicating a position of a resource set and the method for performing rate matching, and therefore, the implementations of these equipment may refer to the implementations of the methods, the descriptions thereof are omitted herein.

The embodiments of the present application may be implemented according to the following ways.

Figure 5:
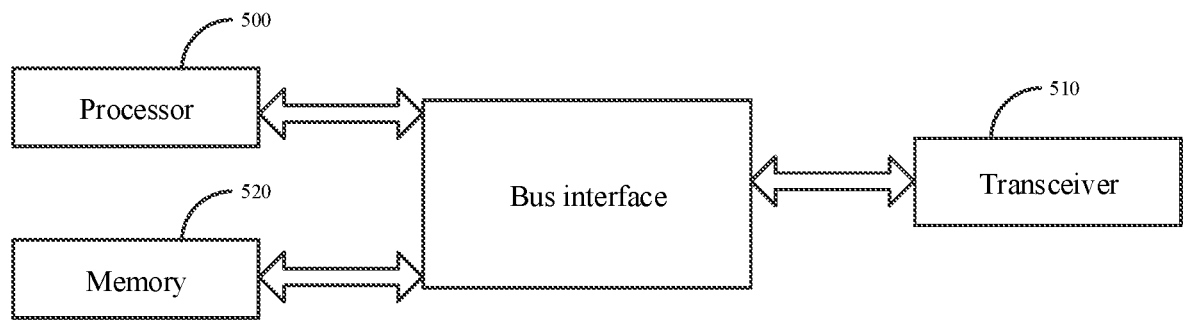
FIG. 5 illustrates a schematic structural diagram of a base station in the embodiment of the present application.

FIG. 5 illustrates a schematic structural diagram of a base station, as shown in FIG. 5, the base station includes:

a processor 500, configured to read a program in a memory 520 and execute the following process:

determining a position of at least one resource set, where the position of the at least one resource set is a position where the rate matching is required when a terminal transmits data on an uplink channel; and a transceiver 510, configured to receive and transmit data under a control of the processor 500 and execute the following process:

indicating the position of the at least one resource set to the terminal via explicit signaling.

In the embodiment, when the base station indicates the position of the at least one resource set to the terminal via explicit signaling, the base station indicates the position to the terminal via high-layer signaling, and the number of the at least one resource set is N, and a period that each resource set occurs is independently configured, and N is a positive integer greater than or equal to 1; and a resource set is composed of T OFDM symbols on a time domain and F RBs on a frequency domain, where T is an integer greater than or equal to 0, and F is an integer greater than or equal to 0.

In the embodiment, the period is configured by the high-layer signaling by taking slot as a device, and a minimum period is 1 slot.

In the embodiment, for any one of the at least one resource set, when T or F is zero, the any one resource set for which the rate matching is required does not exist.

In the embodiment, T OFDM symbols are continuous resources or non-continuous resources, and F RBs are continuous resources or non-continuous resources.

In the embodiment, said indicating, by the base station, the position of the at least one resource set to the terminal via the explicit signaling includes:

configuring, by the base station via the high-layer signaling, N resource sets for which the rate matching is required when the terminal transmits the data on the uplink channel; and indicating, by the base station via L1 signaling, serial numbers of the resource sets for which the rate matching is required when the terminal transmits the data on the uplink channel.

In the embodiment, the serial numbers of the resource sets are indicated to the terminal via M-bit L1 signaling when the number of the resource sets is N, and $M=\text{ceil}(\log_2(N))$, ceil is a function name, and the ceil function is used for returning the minimum integer greater than or equal to a specified expression.

In the embodiment, when the base station indicates the position of the at least one resource set to the terminal via the explicit signaling, the base station indicates the position to the terminal via the L1 signaling.

In the embodiment, the base station indicates the number of the OFDM symbols and the position of the OFDM symbols to the terminal via the L1 signaling with a corresponding quantity of bits.

In the embodiment, the at least one resource set is overlapped with a DMRS on resources.

In FIG. 5, bus architecture may include any number of interconnected buses and bridges and may link various circuits of one or more processors represented by the processor 500 and a memory represented by the memory 520 together. The bus architecture may also link various other circuits such as peripheral equipment, a voltage stabilizer and a power management circuit together, and therefore, further descriptions of the bus architecture are omitted herein. A bus interface is provided with an interface. The transceiver 510 may be a plurality of elements, is composed of a transmitter and a receiver and is provided with devices for communicating with various other devices on a transmission medium. The processor 500 takes charge of managing the bus architecture and general processing, and the memory 520 is for storing data used when the processor 500 executes operations.

Figure 6:
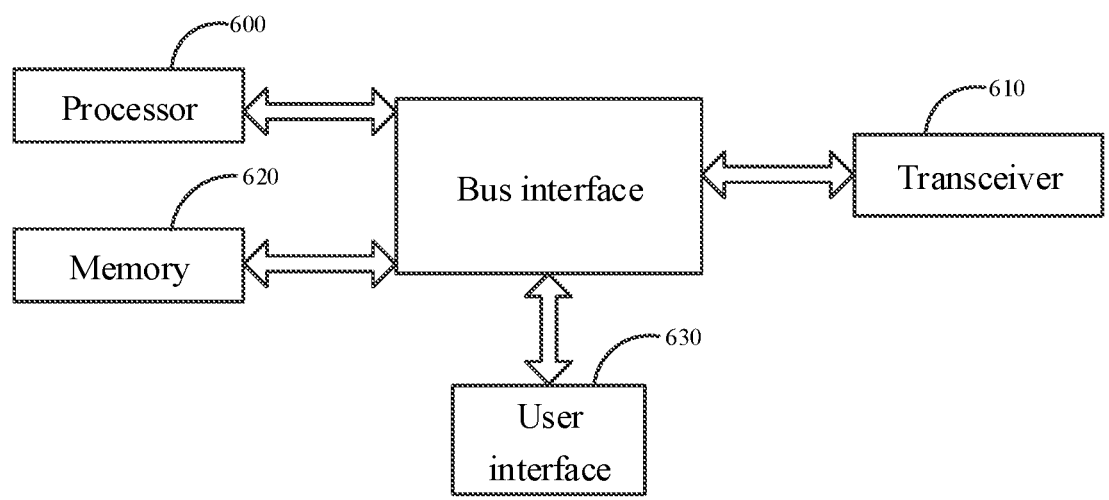
FIG. 6 illustrates a schematic structural diagram of a user terminal in the embodiment of the present application.

FIG. 6 illustrates a schematic structural diagram of a user terminal, as shown in FIG. 6, the user terminal includes:

a transceiver 610, configured to receive and transmit data under a control of a processor 600 and execute the following process:

receiving a position of at least one resource set, indicated to a terminal by a base station via explicit signaling, where the position is a position where the rate matching is required when the terminal transmits data on an uplink channel; and the processor 600, configured to read a program in a memory 620 and execute the following process:

performing the rate matching on uplink data according to the indicated position of the at least one resource set.

In the embodiment, when the base station indicates the position of the at least one resource set to the terminal via explicit signaling, the base station indicates the position to the terminal via high-layer signaling, where the number of the at least one resource set is N, and a period that each resource set occurs is independently configured, and N is a positive integer greater than or equal to 1; and a resource set is composed of T OFDM symbols on a time domain and F RBs on a frequency domain, where T is an integer greater than or equal to 0, and F is an integer greater than or equal to 0.

In the embodiment, the period is configured by the high-layer signaling by taking slot as a device, and a minimum period is 1 slot.

In the embodiment, for any one of the at least one resource set, when T or F is zero, the any one resource set for which the rate matching is required does not exist.

In the embodiment, T OFDM symbols are continuous resources or non-continuous resources, and F RBs are continuous resources or non-continuous resources.

In the embodiment, when the base station indicates the position of the at least one resource set to the terminal via the explicit signaling, the method includes:

configuring, by the base station via the high-layer signaling, N resource sets for which the rate matching is required when the terminal transmits the data on the uplink channel, where N is a positive integer greater than or equal to 1; and indicating, by the base station via L1 signaling, serial numbers of the resource sets for which the rate matching is required when the terminal transmits the data on the uplink channel.

In the embodiment, the serial numbers of the resource sets are indicated to the terminal via M-bit L1 signaling when the number of the resource sets is N, where $M=\text{ceil}(\log_2(N))$, ceil is a function name, and the ceil function is used for returning the minimum integer greater than or equal to a specified expression.

In the embodiment, when the base station indicates the position of the at least one resource set to the terminal via the explicit signaling, the base station indicates the position to the terminal via the L1 signaling.

In the embodiment, the base station indicates the number of the OFDM symbols and the position of the OFDM symbols to the terminal via the L1 signaling with a corresponding quantity of bits.

In the embodiment, the method further includes:

not performing the rate matching on a DMRS when the position of the at least one resource set is overlapped with the DMRS.

In FIG. 6, bus architecture may include any number of interconnected buses and bridges and may link various circuits of one or more processors represented by the processor 600 and a memory represented by the memory 620 together. The bus architecture may also link various other circuits such as peripheral equipment, a voltage stabilizer and a power management circuit together, and therefore, further descriptions of the bus architecture are omitted herein. A bus interface is provided with an interface. The transceiver 610 may be a plurality of elements, is composed of a transmitter and a receiver and is provided with devices for communicating with various other devices on a transmission medium. For different user equipment, the user interface 630 may also be an interface which may be internally/externally connected with required equipment, and connected equipment includes, but is not limited to a keypad, a display, a loudspeaker, a microphone, an operating lever and the like.

The processor 600 takes charge of managing the bus architecture and general processing, and the memory 620 is for storing data used when the processor 600 executes operations.

An embodiment of the present application further provides a device for indicating a position of a resource set, including:

a determining device, configured to determine, by a base station, the position of at least one resource set, where the position of the at least one resource set is a position where rate matching is required when a terminal transmits data on an uplink channel; and an indication device, configured to indicate, by the base station, the position of the at least one resource set to the terminal via explicit signaling.

An embodiment of the present application further provides a device for performing rate matching, including:

a receiving device, configured to receive a position of at least one resource set, indicated to a terminal by a base station via explicit signaling, where the position is a position where the rate matching is required when the terminal transmits data on an uplink channel; and a matching device, configured to perform the rate matching on uplink data according to the indicated position of the at least one resource set.

In order to facilitating description, various parts of the above-mentioned devices are divided into various devices or devices to be separately described according to functions. Of course, the function of various devices or devices may be achieved in the same or a plurality of software or hardware when the present application is implemented.

Based on the above, the embodiments of the present application, the base station informs rate matching information when the terminal transmits the uplink channel; and the terminal performs rate matching on the resource sets configured by the base station when transmitting the uplink channel according to the rate matching information informed by the base station. In the solutions, rate matching may be performed around the determined resource positions when the terminal transmits the uplink channel, so that restrictions generated when the uplink channel is transmitted are reduced.

The embodiments of the present application may provide a method, system or computer program product. Therefore, forms of a complete hardware embodiment, a complete software embodiment or a software and hardware aspect combined embodiment may be adopted in the present application. In addition, a form of the computer program product executed on one or more computer available storage media (including, but not limited to a magnetic disk memory, an optical memory and the like) including computer available program codes may be adopted in the present application.

The present application is described by referring to flow diagrams and/or block diagrams of the method, equipment (system) and computer program product according to the embodiments of the present application. It should be understood that each flow and/or block in the flow diagrams and/or block diagrams as well as a combination of flows and/or blocks in the flow diagrams and/or block diagrams may be realized by computer program instructions. The computer program instructions may be provided to a general-purpose computer, a special-purpose computer, an embedded processor or processors of other programmable data processing equipment to generate a machine, so that a device for achieving specified functions in one or more flows in the flow programs and/or one or more blocks in the block diagrams is generated through the instructions executed by the computer or the processors of other programmable data processing equipment.

The computer program instructions may also be stored in a computer readable memory for guiding the computer or other programmable data processing equipment to work in a specific way, so that the instructions stored in the computer readable memory generate a product including an instruction device, and the instruction device achieves the functions specified in the one or more flows in the flow diagrams and/or one or more blocks in the block diagrams.

The computer program instructions may also be loaded in the computer or other programmable data processing equipment, so that a series of operation steps are performed on the computer or other programmable data processing equipment to generate processing realized by the computer, and furthermore, the instructions executed on the computer or other programmable data processing equipment provide steps for achieving the specified functions in the one or more flows in the flow diagrams and/or one or more blocks in the block diagrams.

What is claimed is:

1. A method for indicating a position of one or more resource sets, comprising:

determining, by a base station, the position of the one or more resource sets, wherein the position of the one or more resource sets is a position where rate matching is required when a terminal transmits data on an uplink channel; and indicating, by the base station, the position of the one or more resource sets to the terminal via explicit signaling.

2. The method according to claim 1, wherein the explicit signaling is high-layer signaling, wherein a number of the one or more resource sets is N, and a period that each of the more resource sets occurs is independently configured, wherein N is a positive integer greater than or equal to 1; and a resource set is composed of T orthogonal frequency division multiplexing (OFDM) symbols on a time domain and F resource blocks (RBs) on a frequency domain, wherein T is an integer greater than or equal to 0, and F is an integer greater than or equal to 0.

3. The method according to claim 2, wherein the period is configured by the high-layer signaling by taking slot as a unit, and a minimum period is 1 slot.

4. The method according to claim 2, wherein for the one or more resource sets, when T or F is zero, the one or more resource sets for which the rate matching is required does not exist.

5. The method according to claim 2, wherein T OFDM symbols are continuous resources or non-continuous resources, and F RBs are continuous resources or non-continuous resources.

6. The method according to claim 1, wherein said indicating, by the base station, the position of the one or more resource sets to the terminal via the explicit signaling comprises:
configuring, by the base station via a high-layer signaling, N resource sets for which the rate matching is required when the terminal transmits the data on the uplink channel, wherein N is a positive integer greater than or equal to 1; and
indicating, by the base station via Layer-1 signaling, serial numbers of the one or more resource sets for which the rate matching is required when the terminal transmits the data on the uplink channel.

7. The method according to claim 6, wherein the serial numbers of the one or more resource sets are indicated to the terminal via M-bit Layer-1 signaling, wherein $M=\mathrm{ceil}(\log_2(N))$.

8. The method according to claim 1, wherein the explicit signaling is Layer-1 signaling.

9. The method according to claim 8, wherein the base station indicates a number of OFDM symbols and a position of the OFDM symbols to the terminal via the Layer-1 signaling with a corresponding quantity of bits.

10. The method according to claim 1, wherein the one or more resource sets is overlapped with a demodulation reference signal (DMRS) on resources.

11. A method for performing rate matching, comprising:
receiving a position of one or more resource sets, indicated to a terminal by a base station via explicit signaling, wherein the position is a position where the rate matching is required when the terminal transmits data on an uplink channel; and
performing the rate matching on uplink data according to the indicated position of the one or more resource sets.

12. The method according to claim 11, wherein the explicit signaling is high-layer signaling, wherein
a number of the one or more resource sets is N, and a period that each of the more resource sets occurs is independently configured, wherein N is a positive integer greater than or equal to 1; and
a resource set is composed of T orthogonal frequency division multiplexing (OFDM) symbols on a time domain and F resource blocks (RBs) on a frequency domain, wherein T is an integer greater than or equal to 0, and F is an integer greater than or equal to 0.

13. The method according to claim 12, wherein the period is configured by the high-layer signaling by taking slot as a unit, and a minimum period is 1 slot.

14. The method according to claim 12, wherein for the one or more resource sets, when T or F is zero, the one or more resource sets for which the rate matching is required does not exist.

15. The method according to claim 12, wherein T OFDM symbols are continuous resources or non-continuous resources, and F RBs are continuous resources or non-continuous resources.

16. The method according to claim 11, wherein when the base station indicates the position of the one or more resource sets to the terminal via the explicit signaling, the method comprises:
configuring, by the base station via a high-layer signaling, N resource sets for which the rate matching is required when the terminal transmits the data on the uplink channel, wherein N is a positive integer greater than or equal to 1; and
indicating, by the base station via Layer-1 signaling, serial numbers of the one or more resource sets for which the rate matching is required when the terminal transmits the data on the uplink channel.

17. The method according to claim 16, wherein the one or more serial numbers of the resource sets are indicated to the terminal via M-bit Layer-1 signaling, wherein $M=\mathrm{ceil}(\log_2(N))$.

18. The method according to claim 11, wherein the explicit signaling is Layer-1 signaling;
wherein the base station indicates the number of OFDM symbols and a position of the OFDM symbols to the terminal via the Layer-1 signaling with a corresponding quantity of bits.

19. The method according to claim 11, further comprising:
not performing the rate matching on a demodulation reference signal (DMRS) when the position of the one or more resource sets is overlapped with the DMRS.

20. A base station, comprising:
a processor, configured to read a program in a memory to:
determine a position of one or more resource sets, wherein the position of the one or more resource sets is a position where a rate matching is required when a terminal transmits data on an uplink channel; and
a transceiver, configured to receive and transmit data under a control of the processor to:
indicate the position of the one or more resource sets to the terminal via explicit signaling.

* * * * *